June 13, 1950     T. H. CLINE     2,511,328
OVEN VENTING

Filed Sept. 16, 1948     2 Sheets-Sheet 2

TRUMAN H. CLINE
INVENTOR.

Patented June 13, 1950

2,511,328

UNITED STATES PATENT OFFICE 2,511,328

OVEN VENTING

Truman H. Cline, Newark, Ohio, assignor to Newark Stove Company, Newark, Ohio, a corporation of Ohio Application September 16, 1948, Serial No. 49,555

2 Claims. (Cl. 219—35)

The present invention relates to improvements in the construction of electrically heated ovens and is concerned more particularly with apparatus of this class as commercially fabricated for domestic kitchen ranges.

In the construction of oven chambers for domestic kitchen ranges employing oil or gas as a heating medium, draft provisions are necessary in order to sustain combustion and these provisions usually contribute towards the maintenance of even heat throughout the oven chamber. In the case of electrically heated ovens, however, where no air supply is required for the purpose of supporting combustion or heating, special provisions must be made in order to introduce a degree of movement of the heated air in the oven, since otherwise and with the air dormant it has been observed that undesirable conditions result. Such conditions include unevenness in the heat intensity between one part of the oven chamber and another, in some instances of which such unevenness produces strikingly contrastably baking and cooking results. Particularly in the case of baking, where bread or cake items are critically responsive to immediate heat impingement, such unevenness has been observed to produce extreme variations upon a single article so that a part of it might become burnt before another part is fully baked.

In order to prevent such highly undersirable results in electrically heated ovens the practice has been established of introducing critically regulated air flow into and out of the oven chamber with the circulation induced by the natural chimney effect and the tendency of heated gases to rise. While this type of air flow has been observed to modify the latent effect of totally closed electrically heated chambers, such alone may not yield fully satisfactory end results for even with casual movements of air an oven chamber thus heated may more often than not acquire preferential flow paths where significant heat contrasts obtain within a single oven chamber.

It is accordingly a principal object of the present invention to devise a system of ventilating electrically heated oven chambers so that an efficient and steady movement of air is induced which will distribute equally throughout the useful space in the oven chamber the heat which is generated by the electrical element within the chamber.

Other and further objects of the invention as such as will become evident during the course of the following detailed description and those manifest from the hereunto appended claims.

For a better understanding of this invention and the teachings whereby it may be practiced, reference will now be had to the illustrations in the accompanying drawings in which like reference numerals designate corresponding parts throughout and in which.

Figure 1:
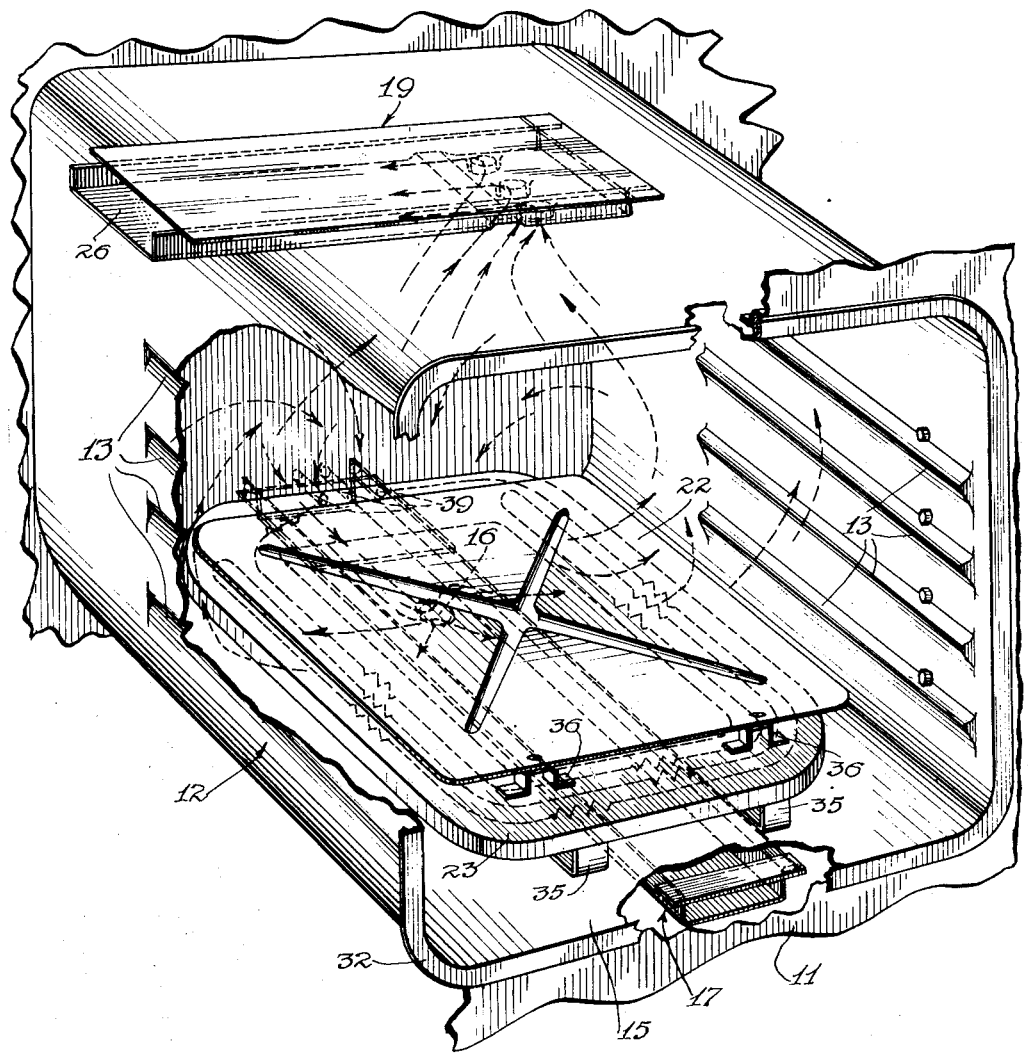
Fig. 1 is a fragmentary perspective view of a rectangular oven chamber end lining having embodied therein the principles of the present invention.
Figure 2:
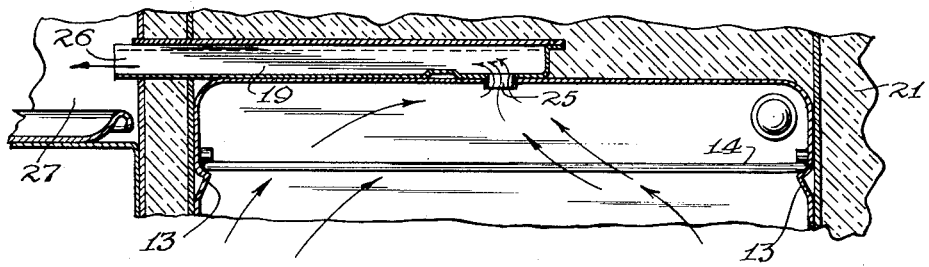
Fig. 2 is a transverse sectional view through an oven such as that illustrated in Fig. 1 with parts broken away, featuring diagrammatically draft flow regulation as observed in this inspection.
Figure 2:
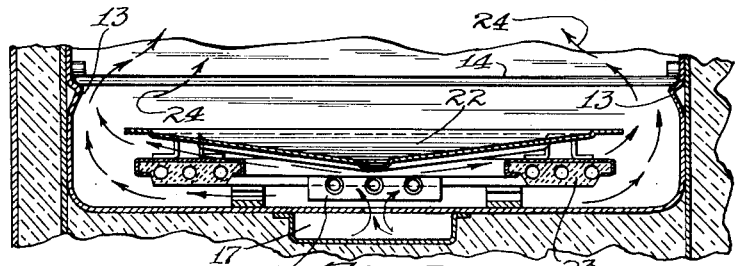
Figure 3:
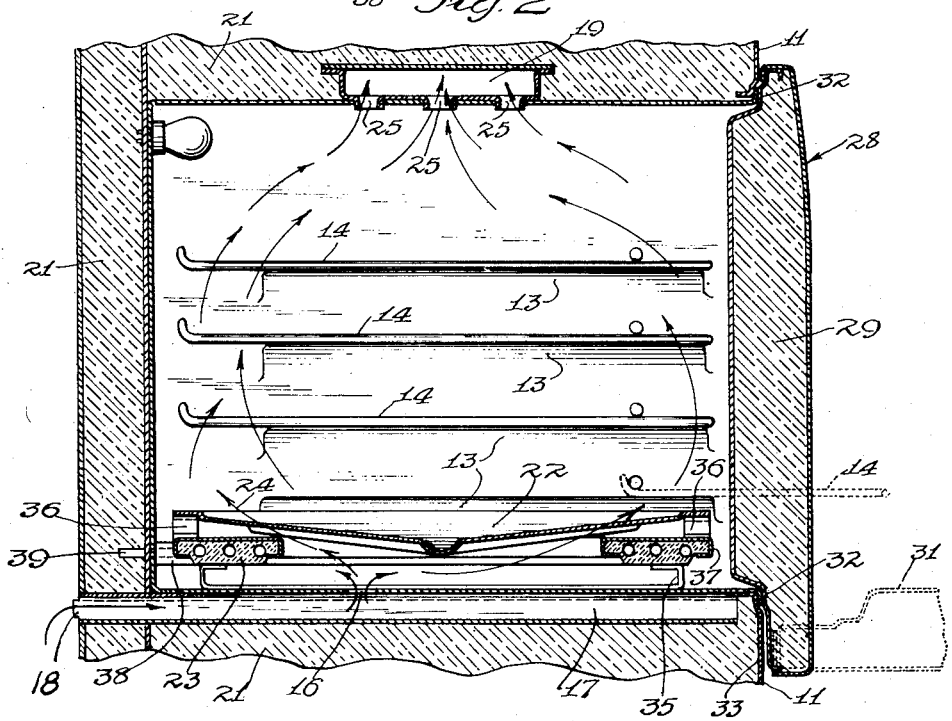
Fig. 3 is a longitudinal sectional view of the same apparatus illustrating diagrammatically the draft flow as observed along a longitudinal inspection.

In Fig. 1 of the accompanying drawings the reference numeral 11 designates a front panel of an oven range through which there are customarily provided various apertures accommodating enclosures for special types of heating, storage, etc. In the particular contemplation of the present invention this front panel is apertured to receive a rectangular liner 12 having top and bottom walls that are smooth and side walls that are embossed as at 13 inwardly for the purpose of affording shelf support at a plurality of levels to various wire shelf grids 14.

The bottom wall 15 of the liner is perforated as at 16, Fig. 1, through which there is permitted to enter the stream of air communicated over a longitudinal rectangular duct 17 which is open as at 18 to room atmosphere.

The entire liner 12, the intake duct 17 and an exhaust duct 19 are surrounded by heat insulating material 21 such as spun glass, mineral wool or other. While this insulation material around the liner 12 performs a utilitarian function of inhibiting heat losses, its provision around the duct 17 is of but casual significance and is so arranged in order to simplify and economize in the assembly operations during oven construction. This is so for the reason that the duct 17, being an intake duct, need not be insulated against heat losses.

The air stream which enters the oven chamber through the opening 16, endeavoring to rise, is deflected by the shallow pyramidal plate 22 which is located above the heater ring 23, so that its course is directed around the outer periphery thereof, after the manner indicated by the arrows 24. In gaining altitude, this stream being heated immediately as it passes over the ring 23 closes in over the oven space until it attains exhaust openings 25 of the discharge vent 19. Thereafter, the stream existing through the discharge opening 26 of the duct 19 passes into the chamber 27 of the oven beneath the surface burners and is dissipated into the room.

An oven door 28 filled with insulating material 29 closes the mouth opening of the oven chamber and is hinged at its lower edge so as to assume the dotted position 31 when ajar and so as to effect close fitting engagement with the liner flange 32 when said door 28 is in its vertical position. Closure of the door 28 effects a substantial seal and any air leakages that occur as, for example, in the region 33 at the lower or hinge portion of the door merely combine with the already described air stream and in this way resilient lining of the door edging is obviated.

The side walls of the liner 12 are embossed as at 13, as has already been described, giving support to the wire ridge shelves 14, and when one or more of these shelves supports food under baking, the described air stream causes an even and constant heat impingement equally on all sides. In this way spot heat concentrations are prevented and even baking assured. Also thereby crazing of the enamelled surfaces of the wall liner and oven door is effectively prevented.

The heater ring 23 is supported on a pair of longitudinal strap brackets 35 and by being provided with a plurality of foot brackets 36, the deflector plate 22 rests securely on the surface of the heater ring 23, which is preferably metal lined as at 37.

In order to make the heater unit a conveniently insertable cartridge, it is provided at one end with a terminal block 38 having three plug type terminal elements 39 that may be pushed into and having wiping contact engagement with three terminal sleeves in the junction block imbedded in the rear wall behind the oven chamber.

The intake opening 16 is located centrally in a side to side sense but at about two-thirds of the distance inwardly of the oven chamber. This arrangement has been observed experimentally to produce ideal air stream distributing conditions taking into account marginal leakages through and under the door as at 33. On the other hand, the exhaust openings 25 are centrally located in both side to side and front to back senses, which arrangement has also been established experimentally and observed to yield a balanced air stream with even heat intensity throughout all parts of the chamber.

While the present invention has been explained and described with reference to a particular embodiment, it will be understood nevertheless that numerous modifications and variations may be incorporated without departing from the essential spirit or scope thereof. It is accordingly not intended to be limited by the specific language employed in the foregoing description nor by the particular illustrations shown in the accompanying drawings except as indicated in the hereunto appended claims.

The invention claimed is:

1. An electrically heated oven construction, comprising a rectangular lining element affording an oven chamber, a lateral heating element located at a level marginally above the bottom wall of said chamber, a hinged closure door having metal to metal contact with a mouth of said liner, a deflector pan supported by said heater formed with a shallow pyramidal taper upwardly and outwardly from a center portion of said heater, and means for securing a constant and continuous air stream within said oven chamber, comprising an intake duct communicating with room atmosphere and having apertured communication with said chamber beneath said heater element at a point approximately two-thirds of the longitudinal distance from the mouth of said oven chamber to the rear thereof and an exhaust duct having an alignment of openings at the approximate center of the upper wall of said oven liner for directing discharge from said oven chamber to room atmosphere.

2. An oven chamber construction, comprising a sheet metal lining element defining a rectangular oven chamber having a mouth opening, a heating element located at a lower level of said chamber, a hinged closure door susceptible of inflow air leakages at low regions near said liner, a deflector pan formed with a shallow pyramidal taper upwardly and outwardly, and ventilating means for securing a constant and continuous air stream within said oven chamber, comprising an intake duct in said liner communicating between room atmosphere and said oven chamber beneath said heater element at a point approximately two-thirds of the longitudinal distance from the mouth opening of said oven chamber to the rear thereof, and an exhaust duct having openings at the approximate center of the upper wall of said oven liner for directing discharge from said oven chamber.

TRUMAN H. CLINE.

REFERENCES CITED

The following references are of record in the file of this patent:

UNITED STATES PATENTS

| Number | Name | Date |
|---|---|---|
| 1,986,886 | Freas | Jan. 8, 1935 |
| 2,408,295 | Cossin | Sept. 24, 1946 |
| 2,442,900 | McCormick | June 8, 1948 |

FOREIGN PATENTS

| Number | Country | Date |
|---|---|---|
| 533,223 | Great Britain | Feb. 10, 1941 |